(12) United States Patent
Avganim

(10) Patent No.: US 9,624,697 B1
(45) Date of Patent: Apr. 18, 2017

(54) COMPUTER SECURITY LOCK FOR TRAPEZOIDAL SECURITY SLOT

(71) Applicant: Meir Avganim, Gealya (IL)

(72) Inventor: Meir Avganim, Gealya (IL)

( * ) Notice: Subject to any disclaimer, the term of this patent is extended or adjusted under 35 U.S.C. 154(b) by 0 days.

(21) Appl. No.: 15/379,705

(22) Filed: Dec. 15, 2016

Related U.S. Application Data

(60) Division of application No. 14/727,354, filed on Jun. 1, 2015, now Pat. No. 9,549,476, which is a continuation of application No. 13/974,648, filed on Aug. 23, 2013, now Pat. No. 9,137,911, and a continuation of application No. 13/476,235, filed on May 21, 2012, now abandoned.

(60) Provisional application No. 61/692,465, filed on Aug. 23, 2012, provisional application No. 61/585,849, filed on Jan. 12, 2012.

(51) Int. Cl.
| | | |
|---|---|---|
| *E05B 69/00* | (2006.01) | |
| *E05B 73/00* | (2006.01) | |
| *G06F 1/16* | (2006.01) | |
| *E05B 65/00* | (2006.01) | |

(52) U.S. Cl.
CPC ...... *E05B 73/0082* (2013.01); *E05B 65/0067* (2013.01); *E05B 73/0005* (2013.01); *G06F 1/1633* (2013.01)

(58) Field of Classification Search
CPC ............... E05B 73/0082; E05B 73/005; E05B 73/0017; E05B 65/0067; A01B 12/006; Y10T 70/40; H05K 5/0208; G06F 1/1656
See application file for complete search history.

(56) References Cited

U.S. PATENT DOCUMENTS

| | | |
|---|---|---|
| 3,971,186 A | 7/1976 | Havelka |
| H906 H | 4/1991 | Baggett |
| 5,502,989 A | 4/1996 | Murray, Jr. |
| 5,787,738 A | 8/1998 | Brandt et al. |
| 6,301,940 B1 | 10/2001 | Derman |
| 6,401,502 B1 * | 6/2002 | Yang ..................... E05B 67/003 70/14 |

(Continued)

OTHER PUBLICATIONS

International Preliminary Report on Patentability (IPRP) issued by the IPEA/EP Patent Office on Jul. 24, 2014 in connection with corresponding application PCT/IB2012/002810.

(Continued)

*Primary Examiner* — Suzanne Barrett
*Assistant Examiner* — Morgan McClure
(74) *Attorney, Agent, or Firm* — Ostrolenk Faber LLP

(57) ABSTRACT

A portable electronic device requiring securing against theft, includes a cavity with an opening thereinto. The opening is accessible at an exterior of the device, and defined by an upper edge, a juxtaposed lower edge, and a pair of juxtaposed side edges. The cavity is defined by an upper wall, a juxtaposed lower wall, and juxtaposed side walls, the side walls being angled relative to each other with a separation distance between them gradually increasing in a direction into said cavity, away from said opening into said cavity, whereby a planar cross section through the cavity that bisects both side walls has a trapezoidal shape. The lock opening has a size and shape slightly larger than the cross-sectional size of the forward section of a locking element and an interior larger in cross-sectional size than at the opening of the cavity.

18 Claims, 15 Drawing Sheets

(56) References Cited

U.S. PATENT DOCUMENTS

| | | |
|---|---|---|
| 6,418,759 B1 | 7/2002 | Zeren et al. |
| 6,463,770 B1 | 10/2002 | Lee |
| 6,536,244 B1 | 3/2003 | Chang |
| 6,591,642 B1 | 7/2003 | Kuo |
| 6,662,602 B1 | 12/2003 | Carl |
| 6,708,535 B1 | 3/2004 | Sanders |
| 6,726,071 B2 | 4/2004 | Baseflug et al. |
| 6,779,370 B2 | 8/2004 | Bellow et al. |
| 7,185,518 B1 | 3/2007 | Huang |
| 7,319,584 B2 | 1/2008 | Wang |
| 7,647,796 B2 | 1/2010 | Francke |
| 7,997,106 B2 | 8/2011 | Mahaffey |
| 8,230,707 B2 | 7/2012 | Hung |
| 8,327,674 B2 * | 12/2012 | Valerio ............... E05B 17/0062 70/21 |
| 8,640,511 B1 | 2/2014 | Derman |
| 8,746,020 B2 | 6/2014 | Anderson |
| 8,820,127 B2 | 9/2014 | Avganim et al. |
| 8,842,422 B2 * | 9/2014 | Hung .................. E05B 73/0005 361/679.01 |
| 2001/0013234 A1 | 8/2001 | Murray |
| 2002/0134122 A1 | 9/2002 | Li |
| 2003/0029208 A1 | 2/2003 | Merrem |
| 2003/0106349 A1 | 6/2003 | Broadbridge |
| 2004/0035158 A1 | 2/2004 | Chang |
| 2004/0129037 A1 | 7/2004 | Avganim |
| 2004/0168486 A1 | 9/2004 | Ling |
| 2004/0261473 A1 | 12/2004 | Avganim |
| 2005/0081582 A1 | 4/2005 | Isaacs |
| 2005/0223757 A1 | 10/2005 | Avganim |
| 2006/0225470 A1 | 10/2006 | Avganim |
| 2007/0119219 A1 | 5/2007 | DeMartinis et al. |
| 2007/0175248 A1 | 8/2007 | Wu |
| 2007/0193314 A1 | 8/2007 | Avganim |
| 2008/0110217 A1 | 5/2008 | Andrews et al. |
| 2008/0163653 A1 | 7/2008 | Anderson |
| 2010/0139341 A1 | 6/2010 | Andersson |
| 2010/0170304 A1 | 7/2010 | Anderson |
| 2010/0180648 A1 | 7/2010 | Knox |
| 2010/0300158 A1 | 12/2010 | Andres et al. |
| 2011/0146358 A1 | 6/2011 | Avganim |
| 2011/0167881 A1 | 7/2011 | Avganim |
| 2011/0283751 A1 | 11/2011 | Avganim |
| 2011/0283752 A1 | 11/2011 | Avganim |
| 2011/0314880 A1 | 12/2011 | Sabata |
| 2012/0006078 A1 | 1/2012 | On et al. |
| 2012/0017656 A1 * | 1/2012 | Senatori ............. E05B 73/0082 70/58 |
| 2012/0160000 A1 | 6/2012 | Avganim et al. |
| 2012/0167647 A1 | 7/2012 | Yu et al. |
| 2012/0216581 A1 | 8/2012 | Tsai |
| 2012/0227448 A1 | 9/2012 | Su |
| 2013/0180295 A1 | 7/2013 | Avganim |
| 2014/0026625 A1 | 1/2014 | Wu et al. |
| 2014/0085788 A1 | 3/2014 | Avganim |
| 2014/0174137 A1 | 6/2014 | Xue |
| 2014/0326027 A1 | 11/2014 | Avganim |
| 2015/0059422 A1 | 3/2015 | Kao |

OTHER PUBLICATIONS

Search Report and Written Opinion issued by PCT Patent Office and received by applicant on Jun. 25, 2013 in connection with corresponding EP patent application No. PCT/IB2012/002810.

U.S. Appl. No. 13/505,492, filed May 2, 2012.

* cited by examiner

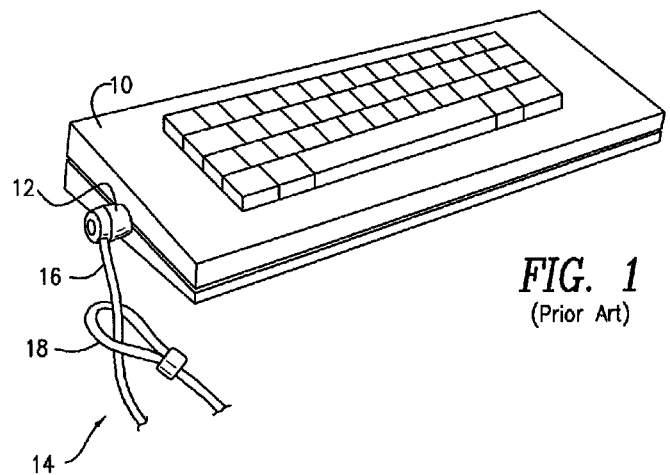
FIG. 1
(Prior Art)
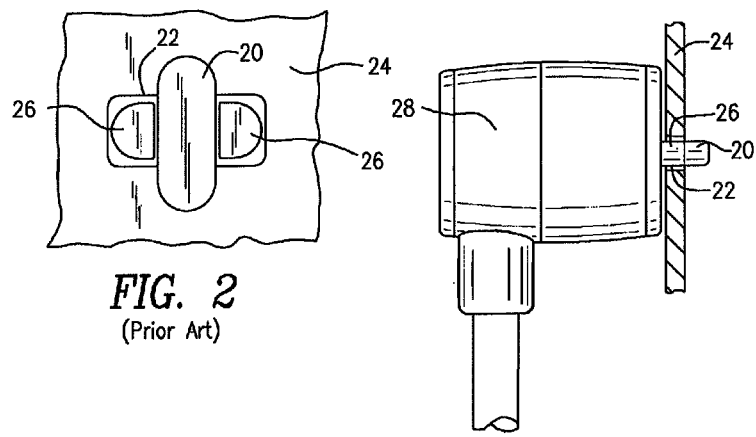
FIG. 2
(Prior Art)
FIG. 3
(Prior Art)

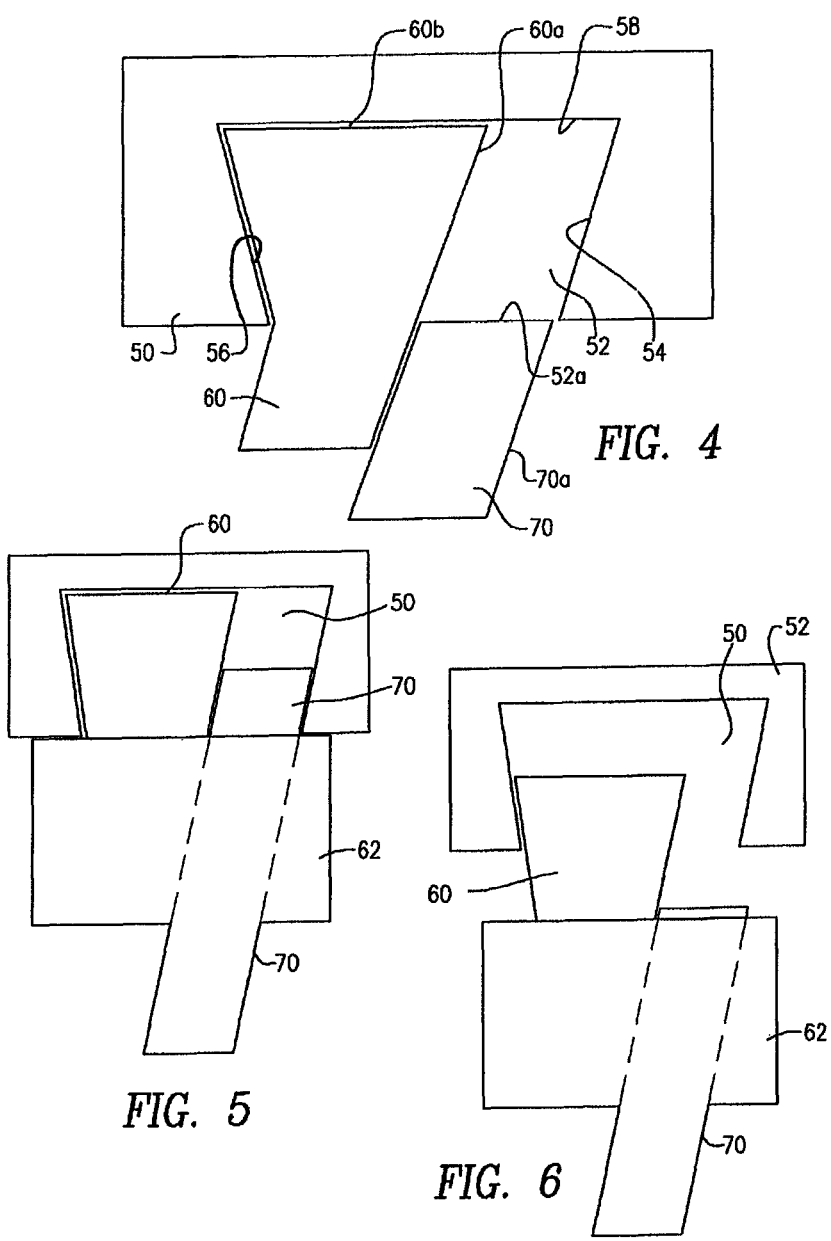

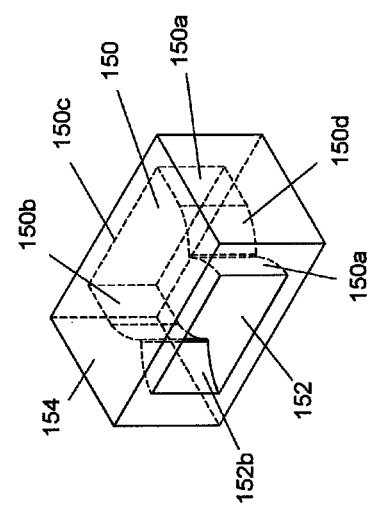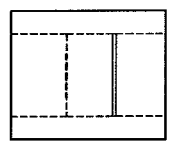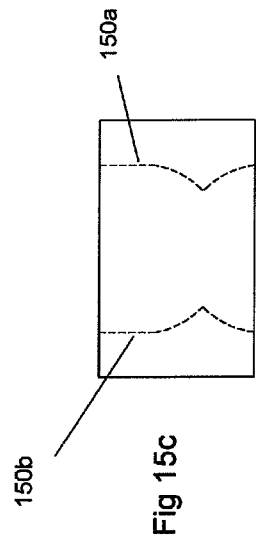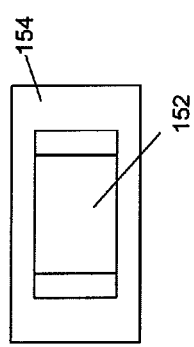

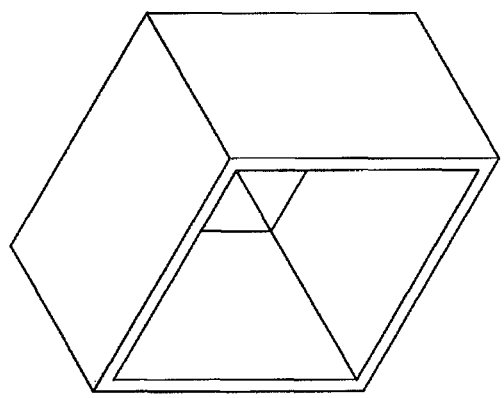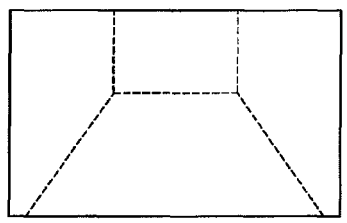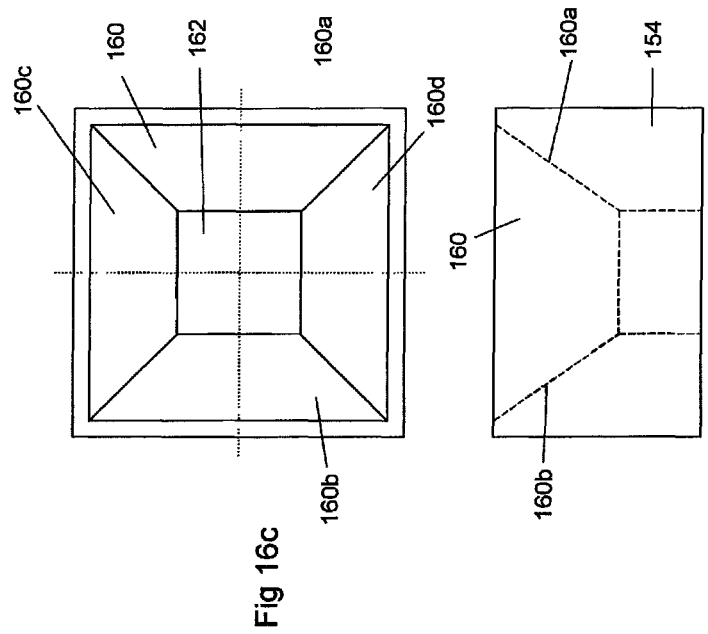

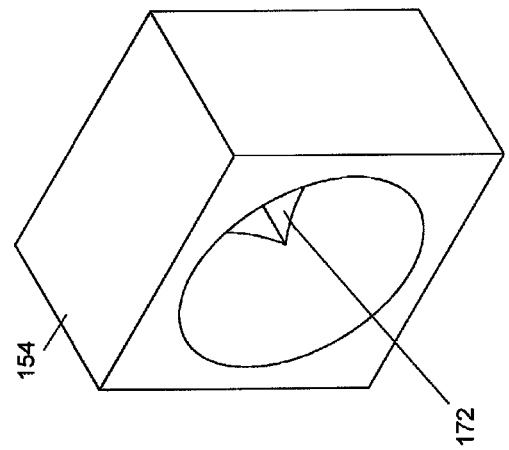
Fig 17a
Fig 17b
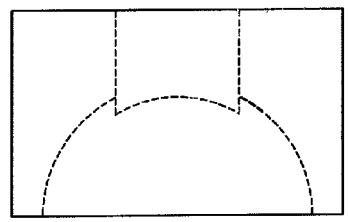
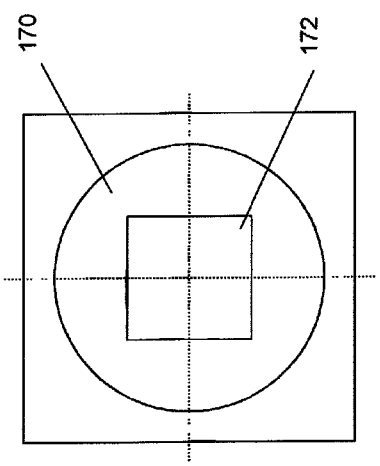
Fig 17c
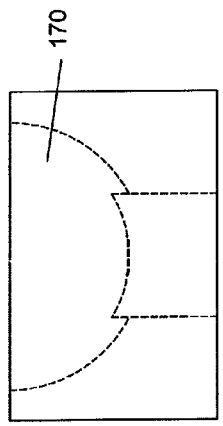
Fig 17d

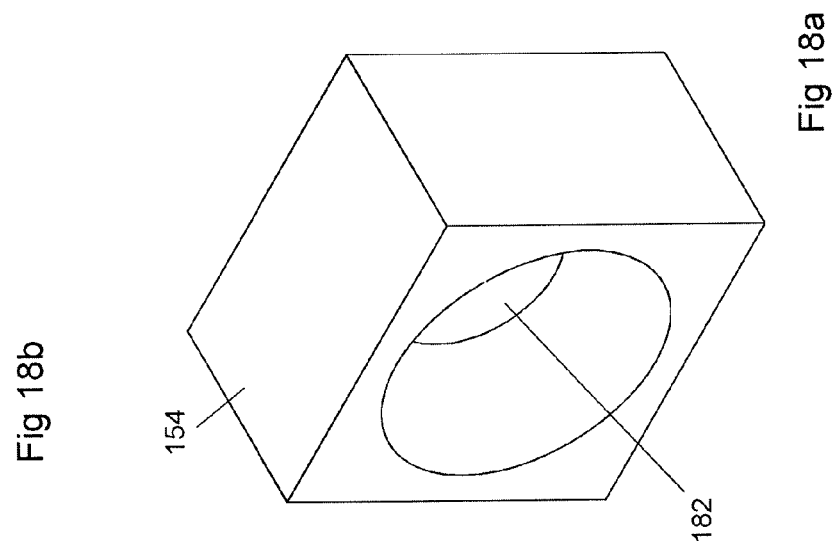
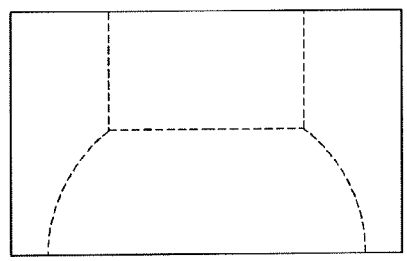
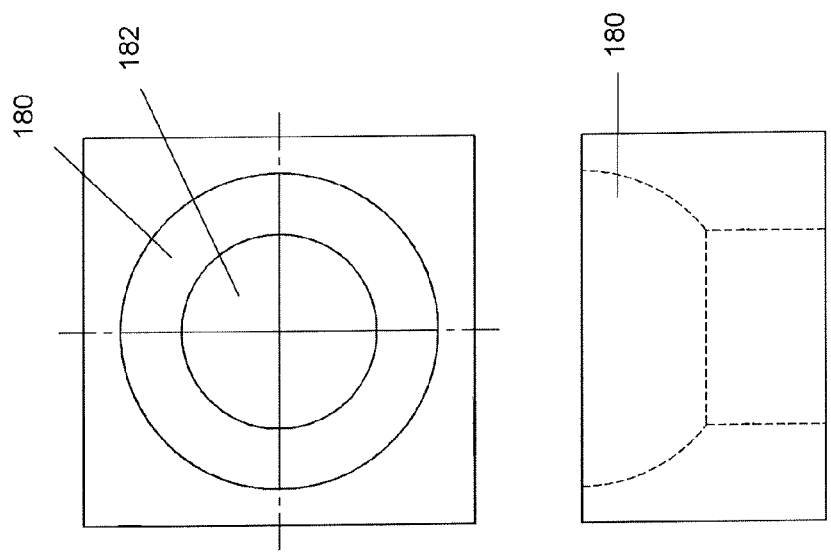
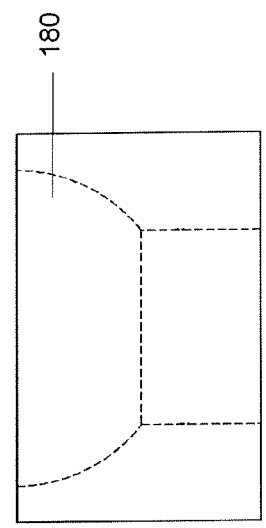
Fig 18a
Fig 18b
Fig 18c
Fig 18d

COMPUTER SECURITY LOCK FOR TRAPEZOIDAL SECURITY SLOT

CROSS-REFERENCE TO RELATED APPLICATIONS

The present application is a divisional under 37 C.F.R. §1.53(b) of Ser. No. 14/727,354, filed Jun. 1, 2015 (now U.S. Pat. No. 9,549,476, issued Jan. 17, 2017), which is a continuation under 37 C.F.R. §1.53(b) of (1) Ser. No. 13/974,648, filed Aug. 23, 2013 (now U.S. Pat. No. 9,137,911, issued Sep. 15, 2015), which claims benefit of Provisional Application Ser. No. 61/692,465, filed Aug. 23, 2012; and (2) Ser. No. 13/476,235, filed May 21, 2012 (abandoned), which claims benefit of Provisional Application Ser. No. 61/585,849, filed Jan. 12, 2012, the contents of which are incorporated herein by reference.

BACKGROUND OF THE INVENTION

The present invention relates to devices for inhibiting the theft of relatively small but expensive pieces of equipment such as computers, telephones and the like. More specifically, the present invention is directed to a theft preventing lock for computers, tablets and the like, which has a locking element which is designed to be received in a trapezoidal or conical, security cavity or slot.

The present invention is directed to a computer security lock of the type disclosed in U.S. Pat. No. 5,502,989, the contents of which are incorporated fully by reference herein. Prior art FIGS. 1, 2 and 3 herein correspond, respectively, to FIGS. 2, 9 and 13A of the aforementioned U.S. Pat. No. 5,502,989 patent.

In FIG. 1, an electronic computer or a keyboard 10 has a security slot into which is inserted a lock 12 which has a cable assembly 14 with a flexible cable 16 and a loop 18. This type of a lock can be used to attach itself to the keyboard 10 and to be tethered to an immovable object, in well known manner.

The lock 12 has a locking element 20 (FIG. 2) which can be rotated in rectangular, 3×7 mm security slot 22 that is formed in the wall 24 of the keyboard, or tablet, or telephone or any small and expensive object 10. The pins 26 prevent rotation of the lock body relative to the security slot 22.

The cable assembly 14 can be coupled to the lock body with a sleeve 28. The wall 24 of the equipment 10 is formed with the slot 22 (FIG. 3) which has the aforementioned pins 26.

The prior art rectangular security slot measuring 3×7 mm and having a rotatable T-bar locking element, e.g., 20, poses issues of complexity, insufficient sturdiness and proneness to breakage in some respects.

Another drawback of the prior art mechanism is that the T-bar locking element 20 needs to rotate behind the wall 24 of the piece of equipment and, as a result, can cause interference with other internal components.

SUMMARY OF THE INVENTION

It is an object of the present invention to provide electronic equipment security locks which avoid at least some of the disadvantages of the prior art.

Another object of the present invention is to provide a lock which does not necessarily need to have a throughgoing opening in the body of the equipment.

The foregoing and other objects are realized with a locking mechanism which is generally similar to those found in the art, except that the locking element is generally trapezoidal or conical in shape and is designed to fit into a security slot in the equipment that has a narrow opening which flares outwardly and defines within a trapezoidal or conical chamber for the purpose of securely holding the locking element therewithin.

In a preferred embodiment of the invention, the lock is configured to be attached to electronic equipment requiring securing against theft and the lock comprising: a lock body; a locking element protruding from the lock body and having a forward distal section that is comparatively wider in cross-sectional size compared to a rear section thereof, the forward section being configured to be insertable into a cavity formed in the equipment, where the cavity is defined by an opening having a size and shape slightly larger than the cross-sectional size of the forward section of the locking element and an interior larger in cross-sectional size than the opening of the cavity; a slidable locking pin configured to slide alongside the locking element and into the cavity, after the locking element has been inserted into said cavity, to substantially fill a space of the cavity left unoccupied by the locking element; a sliding mechanism coupled to the locking pin and configured to slide the locking pin into and out of the cavity; and a locking mechanism to lock the locking mechanism within the lock body to prevent withdrawal of the locking element from the cavity.

In preferred embodiments, the locking element has a pair of side walls that are angled relative to the rear section of the locking element to form the forward distal section. Also the locking pin has two lateral side walls, one of which abuts an adjacent side wall of the locking element and the other which faces an interior side wall of the cavity. Preferably, the cavity has a three dimensional trapezoidal shape in cross-section, and the opening into the cavity and forward footprint of the forward distal section are rectangular in shape.

Preferably, the lock comprises a mechanical structure for holding a cable attached to the lock body, and the lock body has width, length and thickness dimensions and the thickness dimension measures less than 7.9 mm. Also, the width dimension is less than 5 mm and the length dimension is less than 30 mm. Further, the locking element has a width dimension smaller than 4.75 mm and a thickness dimension less than 3.1 mm. Still further, the side walls have an angle of about 70° relative to said rear section of said locking element.

Preferably, the lock includes a locking element base in which a proximate end of the locking element is anchored, the locking element base having a circular circumferential edge which is rotatably held in a complementary circular groove formed in the lock body for allowing rotation of the locking element relative to the lock body, and further comprising an interior passage through which the locking pin is slidable. Preferably, a holder is provided for the sliding pin and the sliding pin has a proximal end which is held in the holder. A retaining pin holds the proximal end of the locking pin in the holder in a manner which allows lateral movement of the proximal end of said locking pin in the holder. A coupling mechanically couples the holder to the sliding mechanism. The locking mechanism is operable by a flat key that is operable to cause the sliding pin to selectively assume a locked position or an unlocked position and to operate the lock mechanism into the locked position and unlocked position without requiring turning of the flat key. The key has a facing side and an opposed rear side and wherein operating the sliding locking mechanism to move and lock the locking pin in the locked position or unlocked position depends on the orientation of the facing side of the flat key in an interior key channel of the locking mechanism.

Other features and advantages of the present invention will become apparent from the following description of the invention which refers to the accompanying drawings.

BRIEF DESCRIPTION OF THE DRAWINGS

FIG. 1 is perspective of a prior art cable locked equipment.

FIG. 2 is a prior art sketch showing a lock with a rotatable T-bar fitted inside a rectangular security slot.

FIG. 3 is an enlarged and partially cut away depiction of a portion of the lock of FIG. 1.

FIGS. 4, 5 and 6 diagrammatically illustrate the locking principle of the present invention.

FIG. 12 shows a preferred lock embodiment for the lock of FIG. 11a.

FIGS. 15a, 15b, 15c and 15d illustrate a further slot embodiment for receiving the lock of the present invention.

FIGS. 16a, 16b, 16c and 16d illustrate a still further embodiment of a slot for receiving the lock of the present invention.

FIGS. 17a, 17b, 17c and 17d illustrate a still further embodiment of a slot for receiving the lock of the present invention.

FIGS. 18a, 18b, 18c and 18d illustrate a still further embodiment of a slot for receiving the lock of the present invention.

DETAILED DESCRIPTION OF EMBODIMENTS OF THE INVENTION

Figure 7:
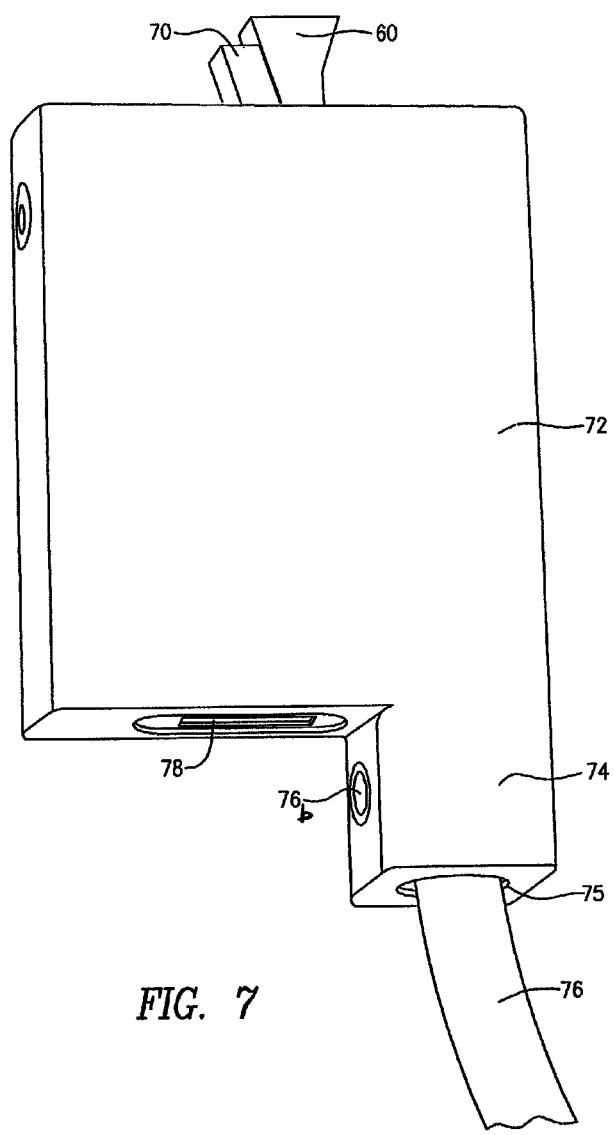
FIG. 7 is a first perspective of an embodiment of the present invention.

With reference to FIGS. 4-6, the locking principle of the present invention is described as follows. The body or wall 50 of equipment that needs to be secured against theft has formed therein a blind (or even through-going) cavity 52 with a generally rectangularly shaped opening 52a (FIG. 10a) which has outwardly tapering side walls 54 and 56 and a back wall 58, defining a trapezoidal shaped slot in a vertical cross section.

The complementary shaped locking element 60 has a leading lock body 60a which has a leading width 60b approximately equal, but slightly smaller than the width of the opening 52a. Therefore, the locking element 60 can be easily inserted into the cavity 52 and pushed to the left, enabling the slidable locking pin 70 to be pushed into the cavity 52, filling it and allowing the right side wall 70a thereof to engage the side wall 54 of the cavity 52. In this state, it is now impossible to pull on the locking element 60 and retrieve it from the cavity 52. The greater the pulling force, the more force is exerted on the slidable pin 70, pushing it against the cavity side wall and the tighter the grasp of the locking mechanism on the cavity, or more precisely, on the block of material which constitutes the wall or body 50 of the equipment. Although (FIG. 10a) shows the top wall 64 and bottom wall 66 of the cavity being flat, the invention is not necessarily so limited. The key is that the cavity has an opening which is narrower than the interior size of the cavity, which allows the insertion of a widening body locking element therein and the locking thereof inside the cavity, as diagrammatically illustrated in FIGS. 5 and 6. Thus, in FIG. 5, the locking element is shown to be integral with the locking element body 62 which has a sliding channel formed therein, in which the locking pin 70 is slidable. In FIG. 6, the locking pin 70 is shown partially moved into the cavity 52.

Figure 8:
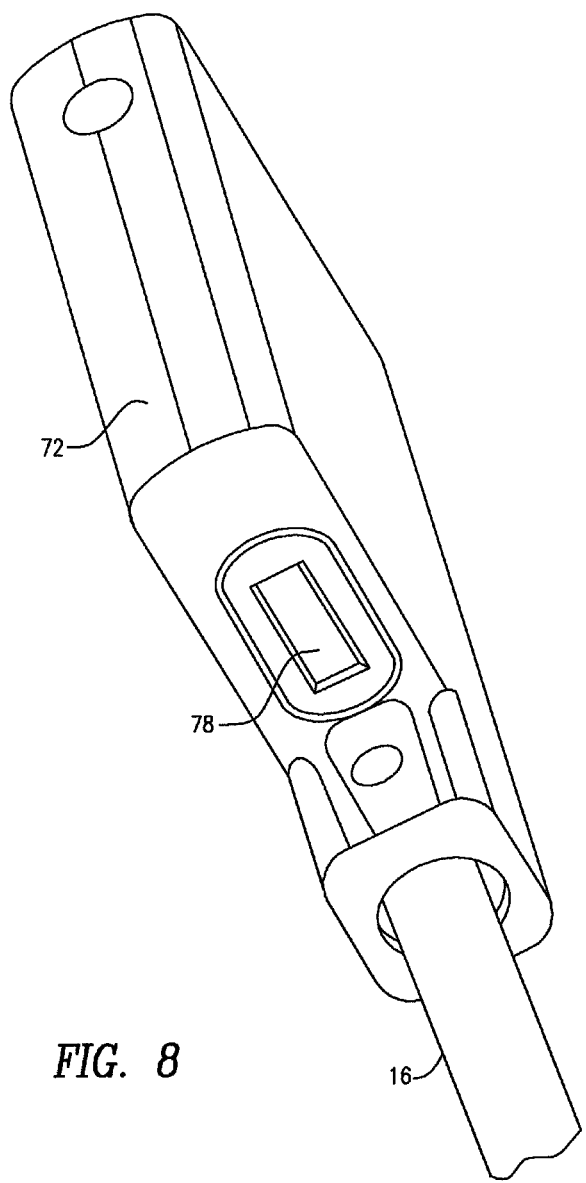
FIG. 8 is a second perspective of one lock embodiment of the present invention.

Referring to FIG. 7, in an embodiment reduced to practice, the lock housing 72 houses therewithin a locking mechanism operable to slide the locking pin 70 alongside the locking element 60 and into the aforementioned slot or cavity. The lock housing has a cable holder 74 with an opening for receiving the proximate end of cable 76 to be held and retained in place by a retaining pin 76b. An opening 78 is provided for a key to operate the sliding, locking pin 70. The slot 78 for the locking key can be seen in FIG. 8.

Figures 9, 9A, 9B:
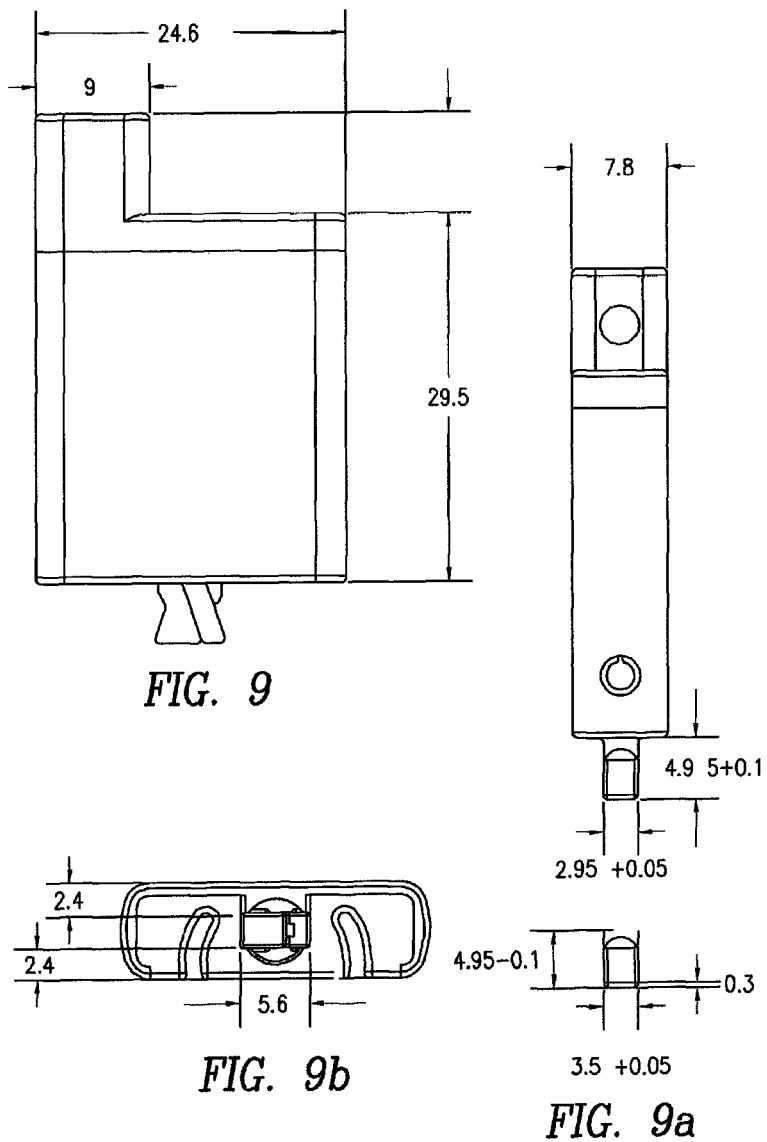
FIGS. 9, 9a and 9b diagrammatically illustrate a preferred embodiment of the lock of the present invention with dimensional specifications.

With reference to FIGS. 9, 9a and 9b, an important aspect of the invention can be appreciated, which derives from the fact that the lock body 72 has a comparatively thin construction with a thickness of or less than about 7.8 mm, a width of about 24.6 mm and a length of about 29.5 mm (excluding the 8 mm extension for the cable holder).

Figure 10:
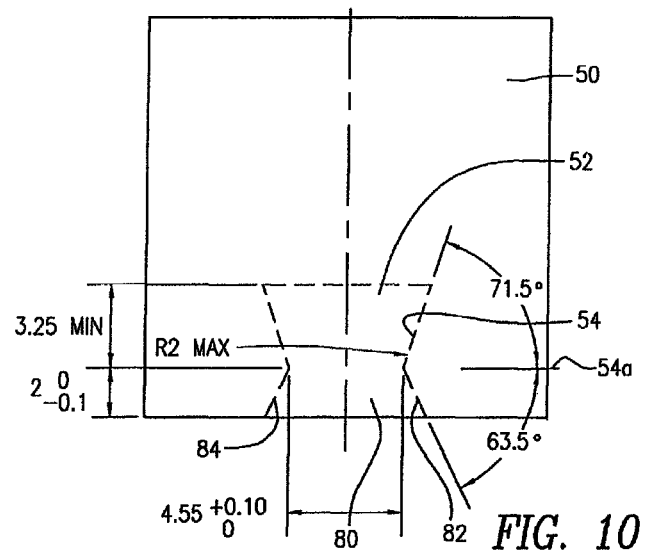
FIGS. 10, 10a and 10b illustrate a trapezoidal slot for receiving the lock of the present invention, in accordance with a preferred embodiment.
Figure 10A:
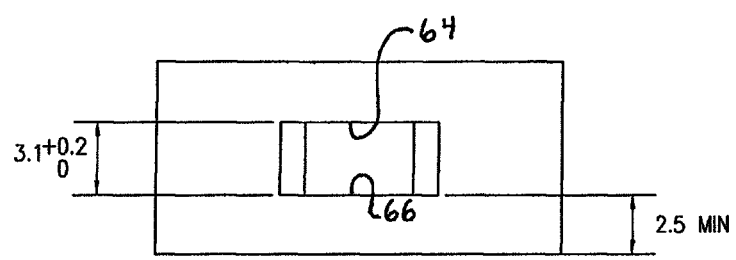
Figure 10B:
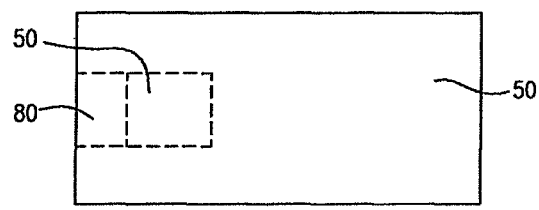

With reference to FIGS. 10, 10a and 10b, the preferred dimension of the cavity 52 provides a depth of a minimum of 3.25 mm and side walls 54 and 56 that extend at an angle of about 71° to the horizontal line 54a, and is further provided with an entrance guideway 80 defined by side walls 82 and 84, which extend at an angle of about 63° relative to the horizontal line 54a. The depth of the guideway is approximately 2 mm, as shown.

In accordance with an embodiment that has been reduced to practice, the lock body 72 and its internal mechanisms are described below by reference to FIGS. 11a, 11b, 11c and 12.

Figure 11A:
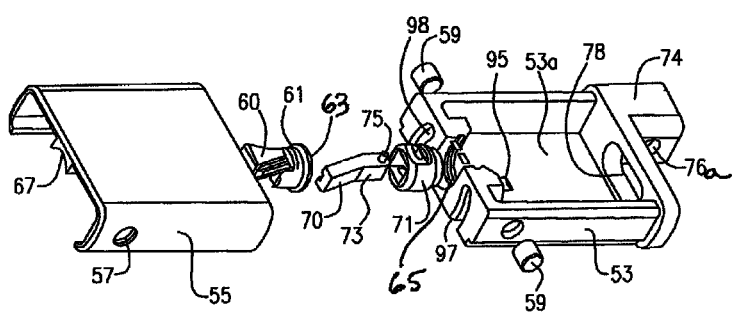
FIG. 11a is a perspective, exploded view of the lock of the present invention.

In FIG. 11a, the lock body base 53 is provided with the cable holder 74 having the opening 76a for the C-set cable retaining screw. The key can be inserted through the opening 78. In the interior cavity 53a can be inserted the locking mechanism shown in FIG. 12. The cover 55 has left and right side panels which fit over the body 53 and which can be secured to the body via retainer pins 59, passing through opening 57, creating the closed lock body 72 shown in FIG. 7. The protruding locking element 60 is integrally formed with a cylindrical body which has a peripheral surface 63 which is shaped to rotatably fit within an annular groove 65 in the body 64, retained therein by the arcuate body 67 of the cover 55. The locking pin 70 protrudes through the cylindrical body 61 and is itself mounted in a holder 71, which has a sliding slot 77 which allows the locking pin to be held therein by means of a pin 75. Thereby, when the body 71 is pushed from right to left and through the hollow cylindrical body 61, it will slide alongside the locking element 60 as shown in FIG. 7. The to be described locking mechanism grasps onto the holding portion 79 (FIG. 11c) which allows the locking pin 70 to slide through the cylindrical body 61.

Figure 11B:
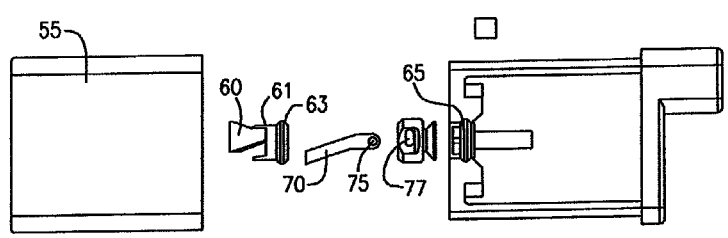
FIGS. 11b and 11c are plan views thereof.
Figure 11C:
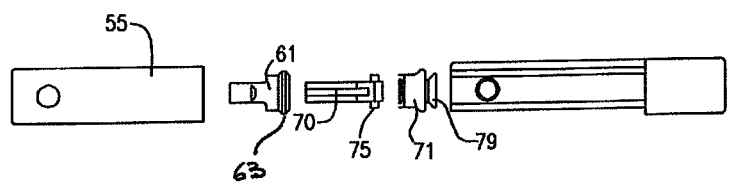
Figure 12:
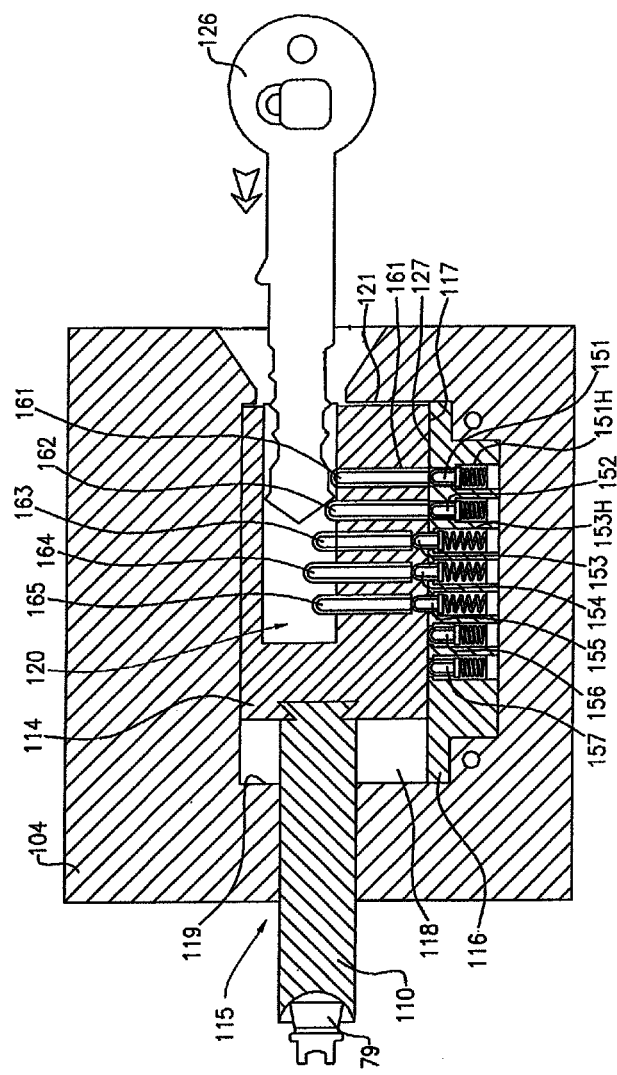

Referring to FIG. 12, the holding portion 79 shown in FIG. 11c is shown at the left of the Figure connected to a pulling/pushing arm 110, which is itself anchored in a sliding block 114 that moves between two positions within the block 104 having a front wall 119 and a rear wall 121. As described in the present inventor's co-pending patent application Ser. No. 13/377,318 (filed on Dec. 9, 2011), when the driving pins 157, 156 and 161 through 165 are controlled by the key 126, through the insertion of the key into the key slot 120, the locking pins 151, 152, 153, 153H, 154 and 155 (located in block 116 which has an upper boundary 117 below the bottom surface 127 of sliding block 114) move by spring action, e.g., spring 151H, out of the chamber 118, allowing the sliding block 114 to move to the left and to become locked in that position until the key orientation is reversed, allowing the pulling bar 110 to be pulled to the right, as shown in FIG. 12. Regardless, the movement of the block 114 either to the left or to the right results in positioning the locking pin inside or outside the cavity 52, respectively. The contents of the aforementioned Ser. No. 13/377,318 co-pending application are incorporated by reference herein. The contents of U.S. application Ser. No. 13/505,492 filed May 2, 2012, which elaborates the details of the flat cylinder lock, are also incorporated by reference herein.

It should be noted again that the perfectly horizontal movements of the bar 110 still results in the locking pin 70 moving forward and to the left in FIG. 11b, owing to the provision of the freedom of movement for the holding pin 75 in the vertically enlarged guide slot 77.

Generically, it is not necessary to provide the lock mechanism as described above, as many other lock mechanisms, including a round body conventional lock that is mounted on top of the cover 55 and which penetrates into the interior 53a can be utilized to slide the locking pin holder 77 to the left and to the right within. Furthermore, the lock mechanism can be operated by a key or even by a combination lock or the like. An advantage of the lock mechanism depicted in FIG. 7 is that it can be inserted into a slot which is located very close to the surface in which the equipment 10 is located. For example, in the case of a very thin tablet computer which is only a fraction of an inch thick, the slot in the rear or side may be located very close to the table surface. Still, the very thin-bodied, low profile lock of the present invention does not interfere and allows the low profile lock mechanism to be utilized without disrupting the resting stability of the tablet on the holding surface.

Figure 14:
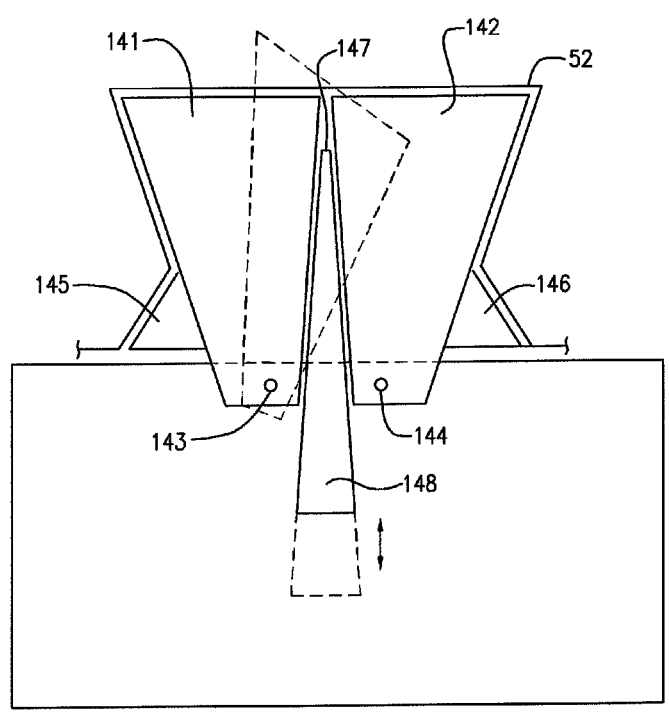
FIG. 14 illustrates an alternative locking mechanism to that of FIG. 12.

With reference to FIG. 14, an alternate embodiment is shown in which the locking element consists of left and right triangular wedges 141, 142, both of which are pivotally mounted at respective pivot points 143, 144 and which can pivot relative to each other to allow them to overlap and thus, to be inserted into the cavity 52. However, as the depth of penetration is increased, the side wall of the entrance guide interact with the projections 145 and 146, which spread the wedges 141, 142 to fill the cavity 52, which exposes an opening therebetween through which a locking pin 148 with a narrow tip 147 can be driven in and out with the mechanism previously described, preventing withdrawal of the lock from the cavity in the equipment 10.

Figure 13A:
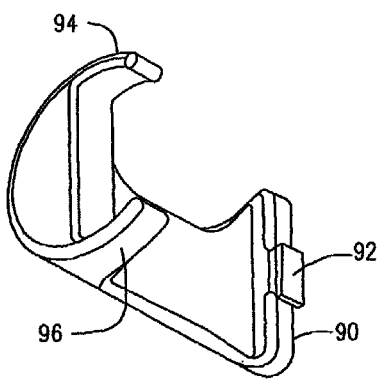
FIGS. 13a, 13b and 13c illustrate a cable holding accessory which is attachable to the lock of the present invention.
Figure 13B:
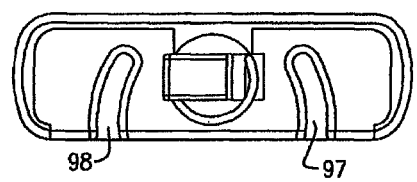
Figure 13C:
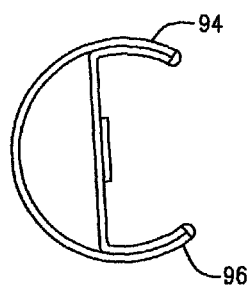

With reference to FIGS. 13a, 13b and 13c, it is noted that the housing of the lock can support a cable locking accessory 90 which has a projection 92 that fits into an opening in the lock body with the two arms 94, 96 engaged in the slots 97 and 98, thereby creating a close space between the accessory 90 and the body through which cables can be threaded, and thus locked in place.

With the present invention, no mechanism is needed to turn a T-bar or to cause scissor-like prongs to move to the right and to the left, as in the prior art. The trapezoidal locking tab 60 is merely inserted and then the pin 70, which has tapered ends, is pushed inside the locking slot, which naturally drags the tab 60 slightly to the left, locking the lock 12 to the piece of equipment and tethering it to an immovable object.

Slot configurations different than those shown in FIGS. 10, 10a and 10b can be utilized. Thus, in FIG. 15a, the slot 150 has curved sidewalls 150a and 150b where the sidewall is somewhat straight and more curved adjacent the opening 152. The opening 152 has sidewalls 152a and 152b. The roof 150c and floor 150d of the slot 150 are flat and parallel to each other. The slot is formed in the block of material 154 which can be nothing more than the thickness of the housing or outside wall of the equipment to be protected against theft.

In similar fashion, the slot 160 in FIGS. 16b and 16c is pyramid shaped with an opening 162. The slot 160 has left and right, outwardly sloping sidewalls 160a and 160b, a floor 160c and 160d, which also taper out. The opening 162 is quite small. But it should be much larger, whereby the sidewalls 160a, 160b, etc., would have a slant relative to the opening which is much shallower than shown.

In FIGS. 17a-17d, the slot 170 is spherical and its opening 172 is rectangular. Lastly, in FIGS. 18a-18d, the slot is again spherical, but the opening 182 into it is circular.

Figure 19:
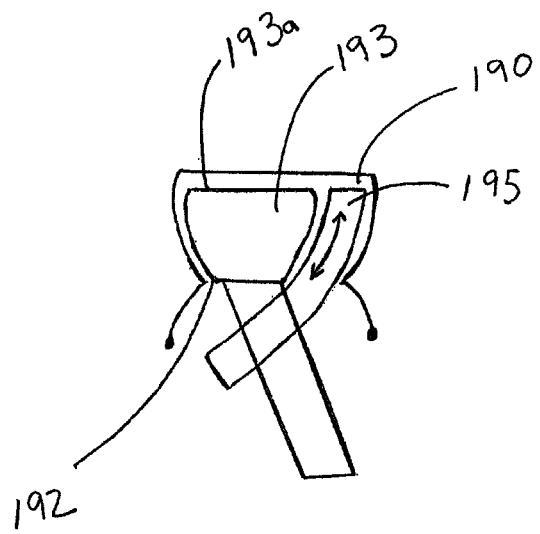
FIG. 19 illustrates diagrammatically a lock that can be utilized with the embodiment of FIGS. 15a-15d.

Referring to FIG. 19, the slot 150 of FIGS. 15a-15d can receive a locking element 193 which has a forward end 193a which measures in width slightly smaller than the opening 192 into the slot 190. After the locking element 193 has been moved to the left, the slidable and curved locking pin 195 is pressed into the slot 190, preventing removal of the locking element 193. The operation is similar to as previously described.

Figure 20:
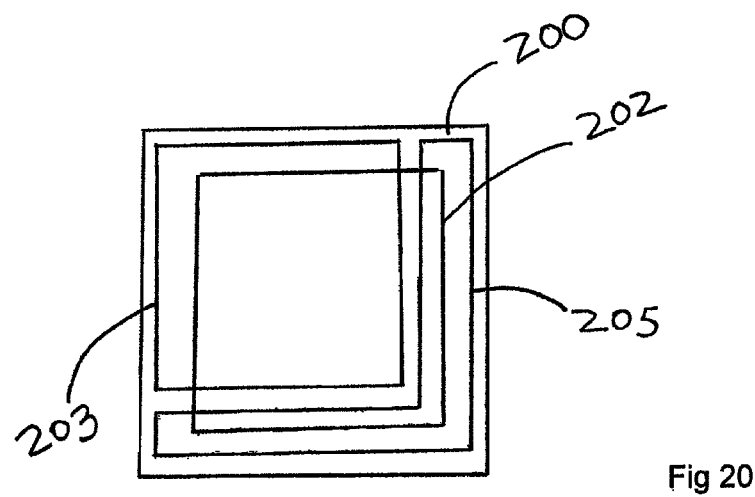
FIG. 20 illustrates diagrammatically a lock mechanism for the slot illustrated in FIGS. 16a-16d.

In FIG. 20, the lock mechanism for the pyramid shaped slot 200 of FIGS. 16a-16d is illustrated in the form of a locking element 203 and an L-shaped locking pin 205. Reference number 202 points to a square which defines the opening into the slot 200. The walls of the slot 200 flare out in all directions, pyramid-like, to form the slot 200.

As described above, the invention is directed to a portable electronic device requiring securing against theft, said device comprising: a device body defined by exterior walls; a cavity having an opening thereinto, the opening being accessible at an exterior wall of said device, and being defined by an upper edge, a juxtaposed lower edge, and a pair of juxtaposed side edges; said cavity being defined by a plurality of cavity walls including an upper wall, a juxtaposed lower wall, and juxtaposed side walls, said side walls being angled relative to each other with a separation distance between them gradually increasing in a direction into said cavity, away from said opening into said cavity, whereby a planar cross section through said cavity that bisects said side walls has a trapezoidal shape.

Further, as described above, the invention is directed to a portable electronic device requiring securing against theft, said device comprising: a portable electronic device requiring securing against theft, said device comprising: a device body defined by exterior walls; a cavity having an opening thereinto, the opening being accessible at an exterior wall of said device, and said opening being defined by an edge that circumscribes said opening and defines a shape of said opening, said opening being configured for the insertion therethrough of locking elements of a locking device; and said cavity being defined by walls extending beyond said opening of said cavity and so defining the cavity that a notional product that substantially fills the cavity is so shaped that it could not be introduced into the cavity through said opening. The above device may have the opening defined by four edges and the cavity is defined by outwardly sloping sidewalls, each respectively extending away from a respective one of said opening edges and said outwardly sloping walls sloping away from each other. The opening is rectangularly shaped. Alternatively, the cavity is spherically shaped and the opening is rectangular. Alternatively, the cavity is spherically shaped and the opening is circularly shaped. Alternatively, the cavity is defined by two opposing walls that are arcuately shaped and by another two opposing walls that are substantially flat, and the opening is rectangularly shaped. An entrance guideway may be provided into the opening.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lock, for being locked inside a computer security cavity having juxtaposed first and second side walls both of which extend away from an opening into said cavity, deeper into said cavity, and both said sidewalls being symmetrically inclined at a predetermined angle relative to a main body plane of said opening, and in which cavity a distance measured between said side walls of said cavity increases gradually in a direction deeper into said cavity, said cavity being further defined by spaced top and bottom walls extending parallel to each other and perpendicularly to said main body plane of said opening and perpendicularly to said side walls, and said side walls facing toward each other across said cavity, said lock comprising:
   a lock body;
   first and second wedge lock elements configured to respectively engage said first and second sidewalls, said first and second wedge lock elements being movable between an unlocked position and a locked position, wherein said wedge lock elements are engaged with and bear against said side walls in said locked position; and
   a moveable pin selectively moveable in a first direction and in an opposite second direction, wherein upon moving in the second direction, said moveable pin causes said first and second wedge lock elements to move to said locked position, and said first and second wedge locked elements being supported by said lock body; and
   wherein each said first and second wedge lock elements includes a respective flat surface, complementary in shape to said side walls, that extends in the same direction and lies against and serves to anchor said respective wedge lock element against one of said sidewalls, when said first and second wedge lock elements have been moved to the locked position.

2. The lock of claim 1, wherein the moveable pin is moveable between said first and second wedge lock elements.

3. The lock of claim 2, including a lock housing and further including a cable secured to said to lock housing at one end thereof and said cable having a loop section at an opposite distal end thereof which is configured to enable the cable and the lock housing to be tethered to an immovable object.

4. The lock of claim 1, wherein said first and second wedge lock elements are non-rotatable in said cavity.

5. The lock of claim 1, including a lock housing, and wherein said lock housing is mechanically coupled to said first and second wedge locking elements, wherein said wedge lock elements are non-rotatably held in said cavity, and wherein said lock housing is rotatable relative to said first and second wedge lock elements while said wedge lock elements are non-rotatably anchored in said cavity.

6. The lock of claim 1, including a locking mechanism.

7. The lock of claim 6, wherein said lock mechanism can be operated between locked and unlocked positions and wherein in said locked position of said locking mechanism, movement of said first and second wedge lock elements from said locked position to said unlocked position of said wedge lock elements is blocked.

8. The lock of claim 7, wherein said locking mechanism is key-operated.

9. The lock of claim 8, including a key that has a flat body and is insertable into in a key slot provided in said locking mechanism, and said key being operable to enable said wedge lock elements to move to their unlocked position by insertion of said key into said key slot and without rotation of said key inside said key slot.

10. The lock of claim 1, wherein said first and second wedge lock elements are so configured that they can only be inserted into the cavity through said opening while held at their unlocked position.

11. The lock of claim 1, wherein said predetermined angle measures about 70 degrees relative to said main body plane of said opening into said cavity.

12. The lock of claim 1, wherein said first and second wedge lock elements are so configured that when positioned in their unlocked position, they can be inserted into the cavity through said opening of said cavity, and said opening being rectangular and measuring about 3.1×4.55 mm.

13. The lock of claim 1, wherein the first and second wedge lock elements have wall engagement surfaces that are complementary in shape to said wall surfaces of said first and second sidewalls of said cavity.

14. The lock of claim 1, in combination with a portable electronic device wherein said portable electronic device comprises said computer security cavity.

15. The lock in combination with a portable electronic device of claim 14, wherein said cavity comprises an entrance guideway into said cavity opening, wherein said entrance guideway has at least two non-parallel walls that serve to guide said wedge lock elements into said cavity through said opening of said cavity.

16. The lock of claim 15, wherein said cavity opening has a lateral dimension of about 4.5 mm.

17. The lock of claim 16, wherein said sidewalls of said cavity include an end section at which the sidewalls curve back toward each other.

18. The lock of claim 1, wherein said wedge lock elements have cavity engaging surfaces that are substantially flat throughout.

* * * * *